US011844312B2

United States Patent
De Camargo et al.

(10) Patent No.: US 11,844,312 B2
(45) Date of Patent: Dec. 19, 2023

(54) ELEVATOR SET OF A HARVESTING MACHINE AND HARVESTING MACHINE

(71) Applicant: CNH Industrial America LLC, New Holland, PA (US)

(72) Inventors: Jean Carlos Pereira De Camargo, Piracicaba (BR); Anderson Antonio Moreno, Piracicaba (BR)

(73) Assignee: CNH Industrial America LLC, New Holland, PA (US)

( * ) Notice: Subject to any disclaimer, the term of this patent is extended or adjusted under 35 U.S.C. 154(b) by 652 days.

(21) Appl. No.: 16/976,626

(22) PCT Filed: Feb. 27, 2019

(86) PCT No.: PCT/BR2019/050058
§ 371 (c)(1),
(2) Date: Aug. 28, 2020

(87) PCT Pub. No.: WO2019/165527
PCT Pub. Date: Sep. 6, 2019

(65) Prior Publication Data
US 2020/0404847 A1    Dec. 31, 2020

(30) Foreign Application Priority Data
Feb. 28, 2018 (BR) .................. BR 10 2018 003979

(51) Int. Cl.
*A01D 61/02* (2006.01)
*A01D 45/10* (2006.01)

(52) U.S. Cl.
CPC .............. *A01D 61/02* (2013.01); *A01D 45/10* (2013.01)

(58) Field of Classification Search
CPC ...... A01D 61/02; A01D 45/10; A01D 61/008; A01D 61/04; A01D 61/00
See application file for complete search history.

(56) References Cited

U.S. PATENT DOCUMENTS

| | | | | | |
|---|---|---|---|---|---|
| 3,103,091 | A | * | 9/1963 | Duncan | A01D 45/10 56/16.6 |
| 3,141,281 | A | * | 7/1964 | Gaunt | A01D 45/10 56/14.5 |
| 3,325,982 | A | * | 6/1967 | Fogels | A01D 45/10 56/11.2 |

(Continued)

FOREIGN PATENT DOCUMENTS

| | | |
|---|---|---|
| BR | PI0703763 A2 | 5/2009 |
| BR | PI0805374 A2 | 9/2010 |

(Continued)

OTHER PUBLICATIONS

PCT International Search Report for PCT application PCT/BR2019/050058, dated May 27, 2019 (12 pages).

*Primary Examiner* — Arpad F Kovacs
(74) *Attorney, Agent, or Firm* — Peter K. Zacharias (57) ABSTRACT

An elevator set for a harvesting machine, such as cane harvesters, capable of providing a damping effect in response to impacts caused to the elevator set during activities in a field. The elevator set includes an elevator housing and an elevator which extends inside the elevator housing between a lower proximal end and an upper distal end. The lower proximal end is fixed to a chassis of the machine, and the upper distal end has an opening for discharging harvested material. The elevator set has a damper system that includes a first element and a second element. The first element is disposed on the elevator housing, and the second element is encased into said first element in a sliding relationship. A connection element is fixed, at one end, to the second element and, on another end, to a portion of the chassis of the machine.

16 Claims, 5 Drawing Sheets

(56) References Cited

U.S. PATENT DOCUMENTS

| | | | | |
|---|---|---|---|---|
| 3,830,046 A * | 8/1974 | Rollitt | ............... | A01D 45/10 56/16.5 |
| 4,039,434 A * | 8/1977 | Croucher | ............... | B07B 9/02 209/285 |
| 4,098,060 A * | 7/1978 | Quick | ............... | A01D 45/10 56/13.9 |
| 4,121,778 A | 10/1978 | Quick | | |
| 4,129,339 A | 12/1978 | Quick | | |
| 4,897,986 A * | 2/1990 | Baker | ............... | A01D 45/10 384/537 |
| 4,924,662 A * | 5/1990 | Quick | ............... | A01D 45/10 56/122 |
| 5,031,392 A * | 7/1991 | Baker | ............... | A01D 45/10 460/59 |
| 5,129,219 A * | 7/1992 | Baker | ............... | A01D 45/10 56/503 |
| 5,485,716 A * | 1/1996 | Baker | ............... | A01D 45/10 56/14.3 |
| 6,745,550 B1 * | 6/2004 | Hinds | ............... | A01D 45/10 56/13.3 |
| 7,811,161 B1 * | 10/2010 | Ricketts | ............... | A01D 45/02 56/16.6 |
| 7,873,456 B2 | 1/2011 | Erdmann et al. | | |
| 8,147,176 B2 | 4/2012 | Coers et al. | | |
| 8,186,497 B2 | 5/2012 | Mackin et al. | | |
| 8,220,236 B1 * | 7/2012 | Benner | ............... | A01D 45/003 56/63 |
| 8,240,115 B2 | 8/2012 | Marchini | | |
| 8,387,998 B2 * | 3/2013 | Hinds | ............... | A01D 45/10 172/624.5 |
| 9,788,485 B2 * | 10/2017 | Craig | ............... | A01D 41/1271 |
| 10,701,864 B2 * | 7/2020 | Burch | ............... | A01D 61/006 |
| 2004/0224735 A1 * | 11/2004 | Hinds | ............... | A01D 45/10 460/70 |
| 2019/0350136 A1 * | 11/2019 | Craig | ............... | F04D 29/403 |
| 2020/0128742 A1 * | 4/2020 | Richard | ............... | A01D 45/10 |

FOREIGN PATENT DOCUMENTS

| | | | | |
|---|---|---|---|---|
| BR | MU9002505 U2 | 3/2013 | | |
| CN | 204948783 U | 1/2016 | | |
| WO | WO-2021049482 A1 * | 3/2021 | ............ | A01D 45/10 |

* cited by examiner

Fig. 1
(State of the art)

ELEVATOR SET OF A HARVESTING MACHINE AND HARVESTING MACHINE

FIELD OF THE INVENTION

The present invention refers, in a general manner, to an elevator set for harvesting machines, especially those intended for harvesting sugarcane and sweet sorghum, which was designed to provide the damping effect in response to any impacts caused to the structure of the elevator during activities in the field.

The invention also refers to a harvesting machine of tall and stalky plants, such as a sugarcane harvester, which contains said elevator set.

BACKGROUND OF THE INVENTION

The state of the art contains countless models of equipment and farming machines developed to provide increased productivity in the harvest of various types of vegetable crops, for example, the harvesters of grains and forages, and also machines that harvest so-called tall and stalky plants, as is the case of sugarcane and sweet sorghum.

The machines designed to harvest these tall and stalky plants are projected and developed to provide the harvest of this specific type of crop, this is because their intrinsic characteristics require their own conditions for suitable processing, from the cut to the transfer to trans-shipments and/or trucks.

In this context, it is known that these machines that harvest tall and stalky plants comprise a chassis that sustains a series of floating rollers and chippers responsible for conducting and chopping the cane into billets, which are transferred to trans-shipments and/or trucks by way of an elevator set.

This elevator set is made of a structure, normally metal, inside of which various components are installed, making it rather heavy, such as the mechanisms responsible for moving the protrusions, which conduct and drag the billets and harvested material to be dumped in the trans-shipments and/or trucks, which, when in operation, move in parallel to the harvesting machine in order to, thereby, with the directing of the upper outlet end of the elevator set to the trans-shipment and/or truck, promote the transfer of the harvested material.

Usually, due to the weight of this elevator set, its structure is anchored by way of a supporting mechanism formed by hydraulic arms that are positioned, on the one hand, in an intermediate region of the structure and, on the other hand, in the structure of the primary extractor. Additionally, the elevator set is also anchored, at its end near the machine, by way of a system of flanges and pins or axles, which permit the elevator to be kept in position and also rotate it by about 180°.

However, albeit functional, it was noted that the mode of construction of elevator sets from the state of the art and, particularly, their supporting mechanisms, may provide risks to the equipment as a whole. More particularly, it is noted that, due to unevenness of the land where these harvesting machines work, the structure of the elevator set, which is often very near the trans-shipment and/or truck, ends up sustaining impacts and potentially conflicting with said trans-shipments or said trucks. Considering that the supporting mechanism is rigid and anchored immovably to the structure of the elevator set, ultimately causes sharper impacts capable of damaging the hydraulic arms and/or other components of the elevator set or of the machine itself.

In more extreme cases, it is possible to note the risk of even affecting the structure and components of the primary extractor system, since the force of the impact is directly transferred and absorbed by the hydraulic arms that are normally fixed in the vicinity of the rotating drum of the primary extractor system or by the flange system provided at the proximal end of the elevator fixed to the machine.

Therefore, it is observed that the harvesting machines of the state of the art, especially those designed to harvest cane and sorghum, reveal some restrictions that can directly affect the productivity of farmers, particularly in relation to the risks of damage caused by any impacts during activities in the field. Thus, it is desirable to eliminate or minimize these drawbacks and, thus, reduce any damage to the machine, avoiding maintenance expenses and non-productive time. This is what is intended to be achieved with the development of the present invention.

DESCRIPTION OF THE INVENTION

Therefore, the objective of the present invention is to provide an elevator set for a harvesting machine, such as cane harvesters, that comprises a damper system having technical, constructive and functional characteristics designed and developed to decrease the risk of damage caused to the machines in the field during harvest, especially to the components and mechanisms of the elevator set.

Therefore, with the purpose of achieving the objectives and technical and functional effects summarized above, among others, the present invention refers to an elevator set of an agricultural machine, the agricultural machine comprises an elevator housing and an elevator which extends inside the elevator housing between the lower proximal end and an upper distal end, the lower proximal end is fixed to the chassis of the machine and the upper distal end has an opening for discharging the harvested material. The elevator set further comprises a damper system which is basically formed by a first element and a second element, the first element being disposed in the structure of elevator housing and the second element being encased into said first element in sliding relationship. Further, at least a connection element is fixed, on the one hand, to said second element and, on the other hand, on a portion of the chassis of the harvesting machine.

According to an embodiment of the elevator set, object of the present invention, said at least a connection element is a hydraulic piston to provide the rotational motion of the elevator set.

According to an embodiment of the present invention, said first element is a fixed base and provided with tracks designed to interconnect with said second element by sliding means.

Additionally, according to an embodiment of the elevator set, object of the present invention, the other end of said at least a connection element is fixed on the structure of the primary extractor of said harvesting machine.

According to another embodiment of the elevator set of the present invention, said damper system comprises the disposition of two first elements installed, each one of them, on the outer side walls of the housing structure, and each one of said first elements is arranged to house a second corresponding element and which is coupled to the respective connection element of the supporting mechanism.

Further, according to another embodiment of the present invention, said first elements of the damper system, which are disposed on the outer side walls of said housing structure, are interconnected by a stopper (103).

In another embodiment of the elevator set of the present invention, said sliding means of the second elements are of the support type in the form of tabs or sliding guides which encase into the respective tracks of the first elements, or pulleys and rollers which move on said tracks.

As commented upon above, the present invention also refers to a harvesting machine, of the type for harvesting tall and stalky plants, that comprises an elevator set, as presented above, which has a damper system installed, on the one hand, in at least a connection element of the supporting mechanism of the elevator set, and on the other hand, in the structure of elevator housing. More particularly, said harvesting machine is designed and developed para the harvest of sugarcane and/or sweet sorghum.

SUMMARY DESCRIPTION OF THE DRAWINGS

The characteristics, advantages and technical effects of the present invention will be better understood by a person skilled in the art based on the detailed description below, provided on an exemplary, not restrictive basis, of embodiments of the invention, and with reference to the accompanying drawings, wherein.

DESCRIPTION OF EMBODIMENTS OF THE INVENTION

The invention will now be described in relation to its particular embodiments, making reference to the accompanying drawings. Said drawings are schematic, and their dimensions and/or proportions may not correspond to reality, as they are meant to describe the invention in a didactic manner. Moreover, certain known and common constructive details may have been omitted for greater clarity and brevity of the description which is set out ahead. The reference numbers are repeated throughout the drawings to identify identical or similar parts. Any terms used such as "above", "below", "front", "back", "right", "left" etc. and variations thereof should be interpreted according to the guidance provided in FIG. 1.

The terms used herein such as harvester, picker, harvesting machine and variations thereof are used indiscriminately to indicate an agricultural machine designed for harvesting a vegetable crop and, in the case of this description, the harvest of tall and stalky plants, such as sugarcane, energy cane, sorghum etc.

Figure 1:
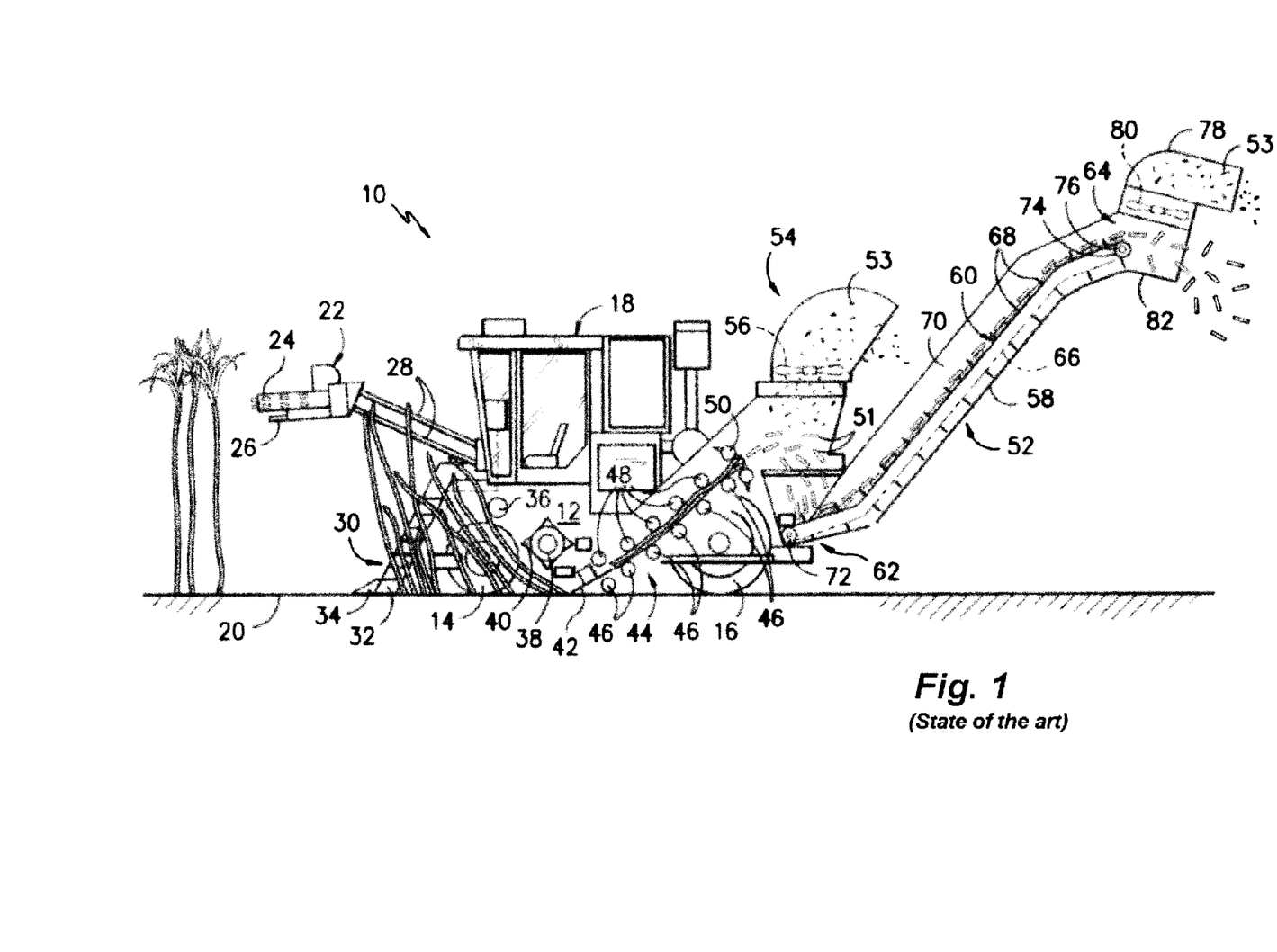
FIG. 1 is a schematic side view lateral of a harvesting machine of cane and sorghum, such as those known in the state of the art.
Figure 2:
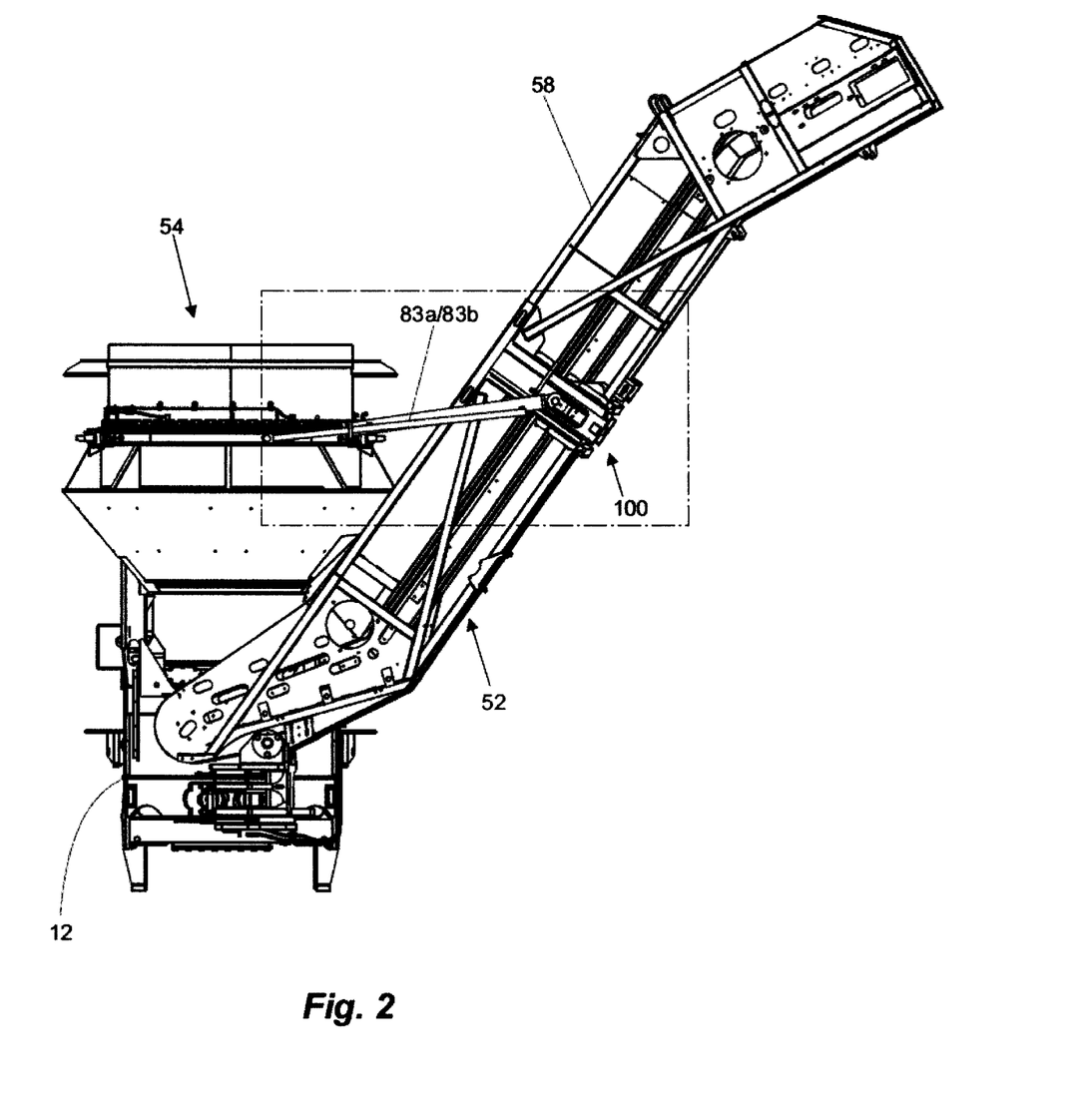
FIG. 2 is a view lateral and partial of the elevator set of a harvesting machine of cane and sorghum with a supporting mechanism containing a damper system, according to the present invention.
Figure 2A:
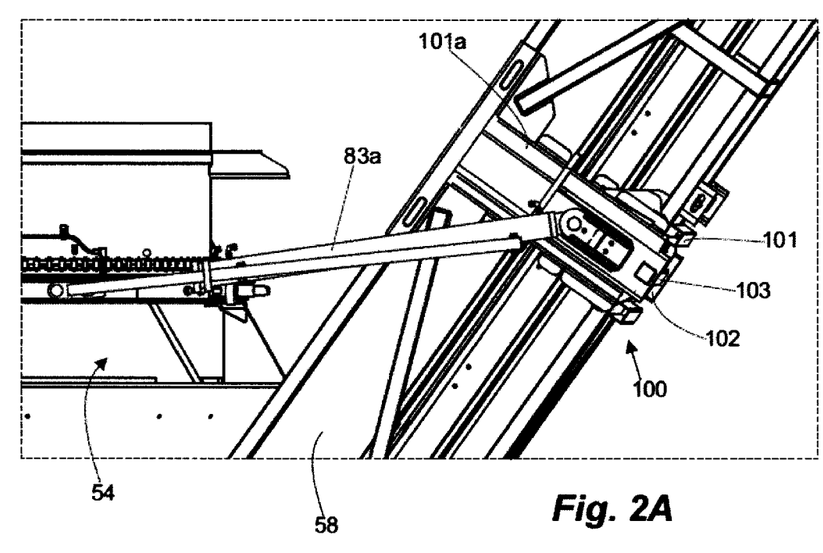
FIGS. 2A and 2B are blown-up side views of the detail (A) indicated in dashed lines in FIG. 2 representing the damper system of the elevator set, according to the present invention, in different work conditions.
Figure 2B:
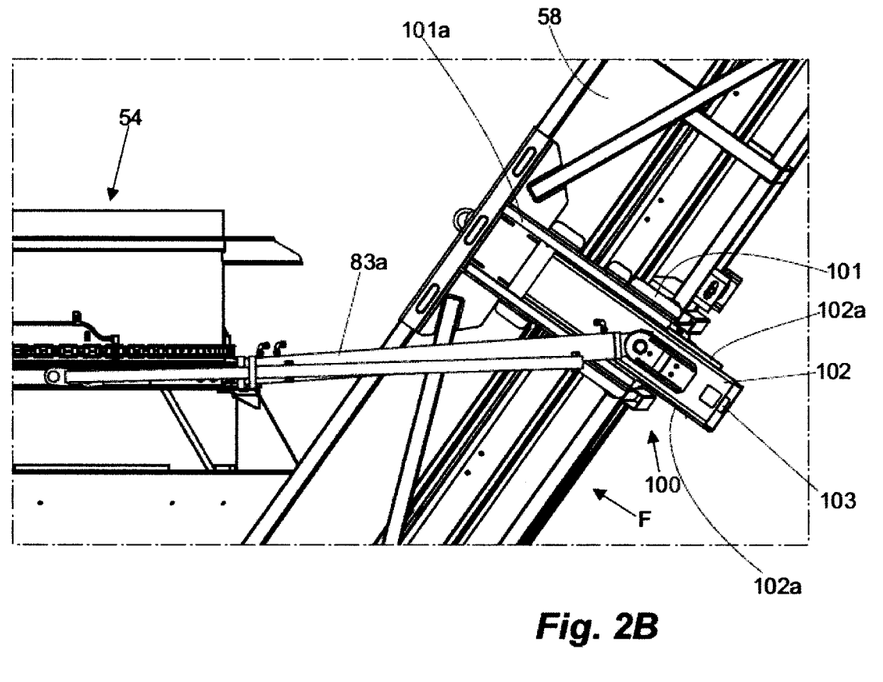
Figure 3A:
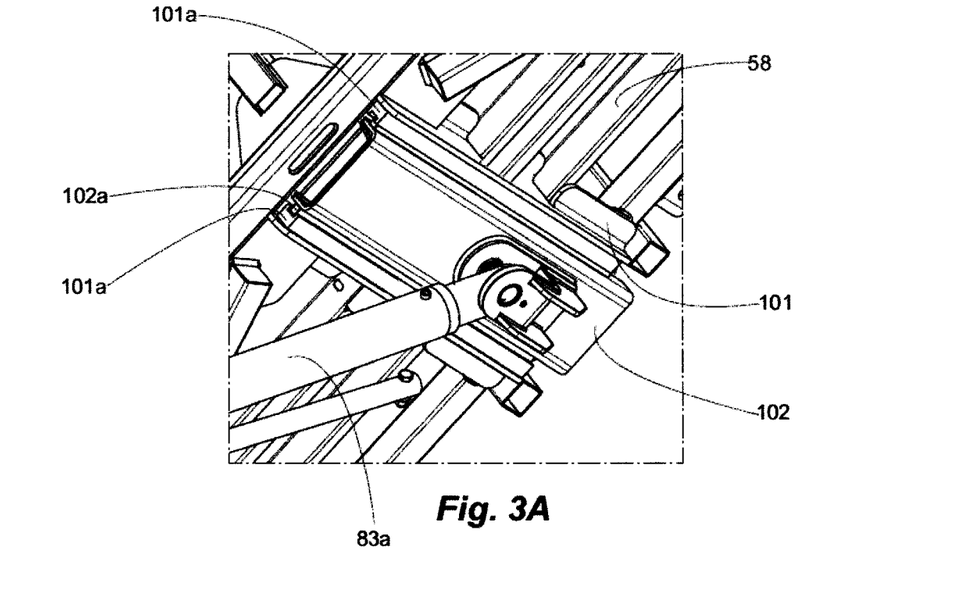
FIGS. 3A and 3B show views representative of the actuation of the damper system of the elevator set, object of the present invention.
Figure 3B:
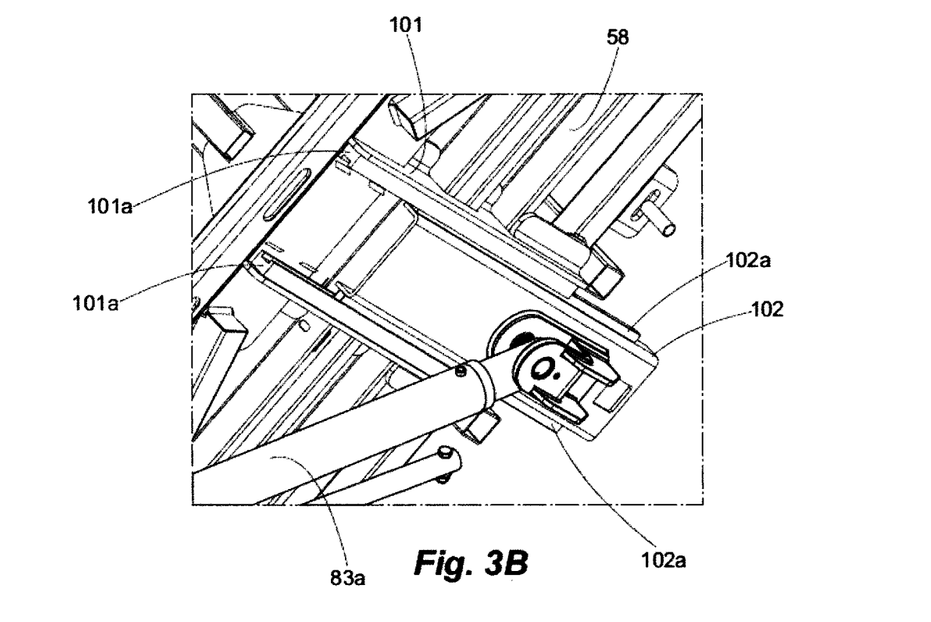
Figure 4:
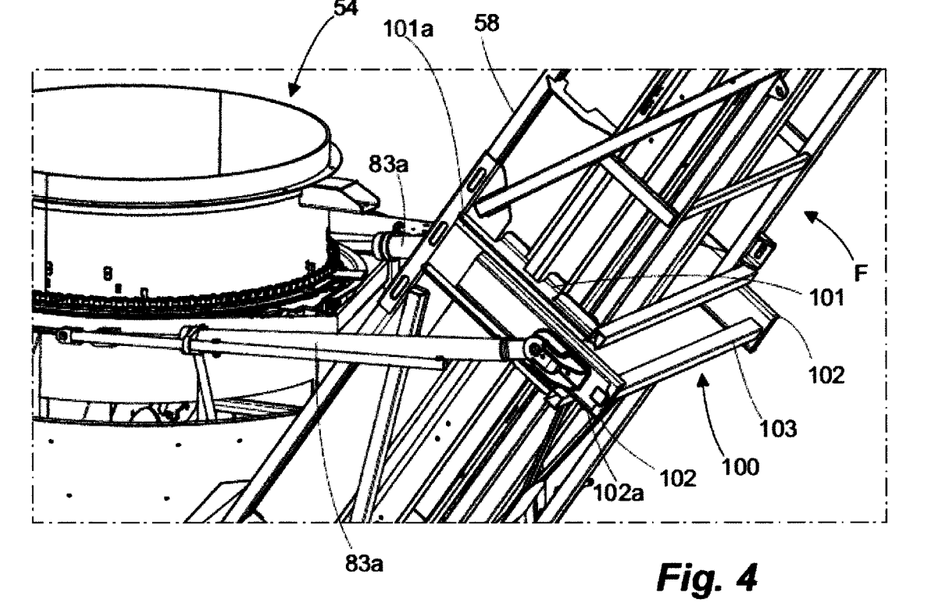
FIG. 4 shows a schematic perspective view of the portion of the elevator set sustained by the damper system, according to the present invention.
Figure 5:
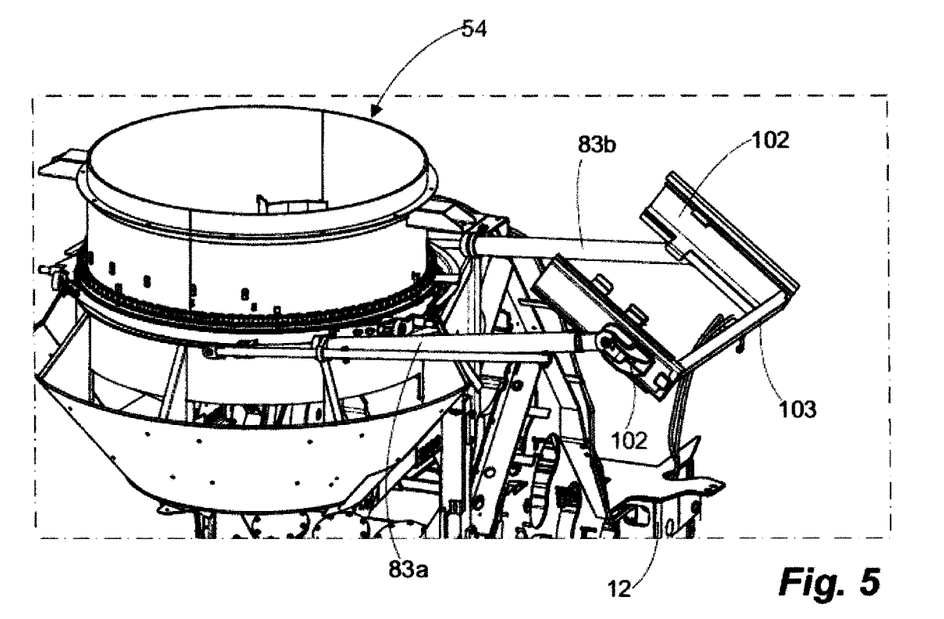
FIG. 5 shows another schematic perspective view of the damper system of the elevator set of the present invention, excluding the representation of the structure of the elevator set.

Now in relation to the drawings, FIG. 1 illustrates a side view of an embodiment of an agricultural harvester 10 according to aspects known in the state of the art. As shown, the harvester 10 is arranged as a sugarcane harvester. However, in other embodiments, the harvester 10 may correspond to any suitable agricultural harvester known in the state of the art.

Also in relation to FIG. 1, the harvester 10 includes a chassis 12, a pair of front wheels 14, a pair of rear wheels 16, and an operator cabin 18. The harvester 10 may also include a primary power source (for example, a motor mounted on the chassis 12) which powers one or both pairs of wheels 14, 16 by means of a transmission (not shown). Alternatively, the harvester 10 may be a harvester driven on belts and, therefore, may include belts activated by motor mechanism instead of the wheels illustrated 14, 16. The motor mechanism may also drive a hydraulic fluid pump (not shown) arranged to generate pressurized hydraulic fluid to drive various hydraulic components of the harvester 10, including wheels or belts.

Additionally, the harvester 10 may include various components to cut, process, clean and unload sugarcane as the cane is harvested from a farm field 20. For example, the harvester 10 may include a tip cutter set 22 positioned at its front end to intercept sugarcane as the harvester 10 is moved forwards. As shown, the tip cutter set 22 may include both a gathering disc 24 and a cutting disc 26. The gathering disc 24 may be arranged to gather sugarcane stalks, such that the cutting disc 26 can be used to cut the tip of each stalk. Generally, the height of the tip cutter set 22 may be adjustable by means of a pair of arms 28 hydraulically raised and lowered, as the operator wishes.

Additionally, the harvester 10 may include a line divider 30 which extends upwards and backwards from the field 20. Generally, the line divider 30 may include two spiral feed rollers 32, also known as "lollipops". Each feed roller 32 may include a soil shoe 34, since its lower end assists the line divider 30 by separating the sugarcane stalks for harvest. Moreover, as shown in FIG. 1, the harvester 10 may include a toppling roller 36 positioned near to the front wheels 14 and a roller with projections 38 positioned behind the toppling roller 36. As the toppling roller 36 is rotated, the sugarcane stalks harvested are toppled while the line divider 30 gathers the stalks from the field 20 towards the inside of the machine 10. Additionally, as shown in FIG. 1, the roller with projections 38 may include a plurality of fins intermittently mounted 40 which assist in forcing the sugarcane stalks down. As the roller 38 is rotated during the harvest, the sugarcane stalks that were toppled over by the toppling roller 36 are sorted and then toppled by the roller 38 as the harvester 10 continues to be moved forwards in relation to the field 20.

Further in reference to FIG. 1, the harvester 10 may also include a base cutter set 42 positioned behind the roller 38. As is generally understood, the base cutter set 42 may include blades (not shown) to cut the sugarcane stalks as the cane is harvested. The blades, located at the periphery of the set 42, can be rotated by a hydraulic motor (not shown) driven by the vehicle's hydraulic system. Additionally, in various embodiments, the blades can be angled down to cut the base of the sugarcane as the cane is toppled by the roller 38.

Moreover, the harvester 10 may include a set of one or more floating rollers 44 located downstream of the base cutter set 42 to move the cut sugarcane stalks from the base cutter set 42 along the processing trajectory. As shown in FIG. 1, the floating roller set 44 may include a plurality of lower rollers 46 and a plurality of upper rollers 48. As the sugarcane is conveyed across the floating roller set 44, waste (for example, stones, dirt and/or the like) may also be conveyed or fall through the lower rollers 46 over the field 20.

Additionally, the harvester 10 may include a chopper set 50 located at the downstream end of the floating roller set 44 (for example, adjacent to the rearmost floating lower and upper rollers 46, 48). Generally, the chopper set 50 can be used to cut or chop the harvested sugarcane stalks into smaller pieces or "fragments" 51 which may, for example, measure 15.24 cm (six (6) inches), also called billets. The fragments 51 can then be driven towards an elevator set 52 of the harvester 10 to be collected in an external receptor or storage device (not shown).

As is generally understood, pieces of waste 53 (for example, dust, dirt, leaves, etc.) sorted from the sugarcane fragments 51 can be expelled from the harvester 10 by way of a primary extractor 54, which is located behind the chopper set 50 and is oriented to direct the waste 53 out of the harvester 10. Additionally, a fan 56 can be mounted on the primary extractor 54 to generate a suction force or sufficient vacuum to capture the waste 53 and force the waste 53 through the primary extractor 54. The waste 53 is then directed out of and generally in the opposite direction of the harvester 10 by means of an outlet of the primary extractor 54. The sorted fragments 51, heavier than the waste 53 being expelled from the extractor 54, can then fall onto the elevator set 52.

According to this specification, the elevator set 52 should be understood as comprising, in general, an elevator housing 58 and an elevator 60 which extends inside the elevator housing 58 between a lower proximal end 62 and an upper distal end 64. The lower proximal end 62 being fixed to the machine 10 and the upper distal end 64 having an opening for discharging the harvested material.

In additional or alternative embodiments, the elevator 60 may include a chain or conveyor belt 66 and a plurality of paddles or protrusions 68 coupled or spaced uniformly on the chain 66. The protrusions 68 can be arranged to secure the fragments of sugarcane 51 in the elevator 60 as the fragments 51 are lifted towards the top of the elevator 70. Additionally, the elevator 60 may include lower and upper sprockets 72, 74 positioned around the proximal and distal ends 62, 64, respectively. As shown in FIG. 1, an elevator motor 76 can be coupled to one of the sprockets (for example, the upper sprocket 74) to drive the chain 66, whereby enabling the chain 66 and the protrusions 68 to travel in an endless cycle between the proximal and distal ends 62, 64 of the elevator 60.

Moreover, pieces of waste 53 (for example, dust, dirt, leaves, etc.) sorted from the fragments of sugarcane 51 can be expelled from the harvester 10 by way of a secondary extractor 78 coupled to the rear end of the elevator housing 58. As shown in FIG. 1, the secondary extractor 78 can be situated adjacently to the distal end 64 of the elevator 60 and can be oriented to direct the waste 53 out of the harvester 10. Additionally, a fan 80 can be mounted on the secondary extractor 78 to generate a suction force or sufficient vacuum to extract the waste 53 and force the waste 53 through the secondary extractor 78. The sorted fragments 51, heavier than the waste 53 expelled through the extractor 78, can then fall from the distal end 64 of the elevator 60. Typically, the fragments 51 can fall through a discharge opening 82 of the elevator set 52 into an external storage device (not shown), such as a wagon, a trans-shipment, a skip etc.

During the operation, the harvester 10 is driven across the entire field 20 to harvest sugarcane or any other stalky and tall plant. Once the height of the tip cutter 22 is adjusted (if used) by means of the arms 28, the gathering disc 24 on the tip cutter set 22 may act such as to gather the sugarcane tips as the harvester 10 proceeds across the field 20, while the cutting disc 26 cuts the leafy tips of the sugarcane stalks to dump them along both sides of the harvester 10. As the stalks enter the line divider 30, the shoes 34 may arrange the width of the operation to determine the amount of sugarcane entering the throat of the harvester 10, either in a fixed or adjustable manner. The lollipops 32 then gather the stalks at the entrance of the machine to enable the toppling roller 36 to bend the stalks down jointly with the action of the feed roller 38. Once the stalks are positioned at an angle as shown in FIG. 1, the base cutter set 42 may then cut the base of the stalks of the field 20. The cut stalks are then directed to the floating roller set 44.

The cut sugarcane stalks are conveyed backwards by the floating rollers 46, 48 which compress the stalks and the matter harvested. At the downstream end of the floating roller set 44, the chopper set 50 cut or chops the compacted sugarcane stalks into pieces or fragments 51. Waste conveyed 53 (for example, dust, dirt, leaves, etc.) sorted from the sugarcane fragments 51 are then extracted through the primary extractor 54 using the suction created by the fan 56. The fragments sorted/washed 51 then fall onto the elevator set 52 and travel upwards by means of the elevator 60 from its proximal end 62 to the distal end 64. During normal operation, since the fragments 51 reach the distal end 64 of the elevator 60, the fragments 51 fall through the discharge opening 82 into an external storage device. Similar to the primary extractor 54, the waste is blown out of the harvester 10 through the secondary extractor 78 with the assistance of the extractor fan 80.

A harvesting machine 10, such as the one described above, may be, for example, a machine known in the state of the art, such as a CNH Industrial N.V. cane harvester commercialized under the Case IH trademark.

Now, in relation to FIGS. 2 to 5, there is presented an elevator set according to the invention. The elevator set 52 comprises a damper system 100 developed to be installed in the external part of the housing 58 of the elevator set 52. Although not disclosed in FIG. 1, cane harvesting machines may also comprise connection elements 83*a*, 83*b* of the supporting mechanism of the elevator set 52 so as to enable the rotation of the elevator set.

As can be noted better in FIGS. 2 to 5, the damper system 100 basically comprises the disposition of a first element 101 and a second element 102 which is, in some way, interconnected with said first element 101 in a sliding relationship, and, said first element 101 is a fixed base provided with tracks 101*a* designed to interconnect with said second element 102 by sliding means 102*a*. Said first and second elements 101, 102 are disposed, respectively, in the structure of the elevator housing 58 and encased jointly with the connection elements 83*a*, 83*b* of the supporting mechanism of the elevator set 52.

More particularly, the damper system 100 of the elevator set, according to the present invention, is comprised by the disposition of two first elements 101 disposed, each one of them, on the outer side walls of the structure of the housing 58, and each of these first elements 101 receives a second element 102 which is coupled to the respective connection elements 83*a*, 83*b* of the supporting mechanism of the elevator set 52, and is susceptible to sliding on said tracks 101a of the first elements 101 as a force (F) is generated by virtue of the impact of the elevator set 52 with the trans-shipment or skip.

As an example of an embodiment of the present invention, said connection elements 83a, 83b are rotating pistons intended to promote rotational movement of the elevator, said pistons may be of the hydraulic piston type. As an exemplary embodiment of the present invention, said connection elements 83a, 83b are rotary pistons designed to promote rotational motion of the elevator, and said pistons can be of the hydraulic piston type.

According to an embodiment of the present invention, said first elements 101 positioned on the outer side walls of the housing structure 58 are interconnected by a stopper 103 whose purpose is to increase stability and ensure alignment during the sliding of the respective second elements 102 in relation to the first elements 101 and also provide stable support for the support of the elevator set 52 of the machine 10.

Under these conditions, as can be ascertained, the damper system 100 enables the elevator set 52, object of the present invention, to move in response to impacts that may be caused by contact with the trans-shipments and/or skips during the harvesting work, without prejudice to the damping of any unevenness of the terrain transmitted to the elevator. Moreover, said damper system 100 ends up, in a complementary way, performing the function of the supporting mechanism of the elevator set 52, ensuring the positioning of the housing structure 58, without straining the bearings and the mechanisms of the elevator set 52.

According to possible embodiments of the present invention, the sliding means 102a can present different arrangements, for example, supports in the form of tabs or sliding guides which encase into the respective tracks 101a, pulleys and rollers which move on said tracks 101a, or any other equivalent means and capable of providing the free movement of the second element 102 in relation to the first element 101 of the damper system 100.

The accompanying drawings illustrate embodiments wherein the first element 101 is fixed next to the outer walls of the structure of elevator housing 58 and said second element 102 is connected to the connection elements 83a, 83b of the supporting mechanism of the elevator set 52. However, as persons skilled in the art will appreciate, there is nothing to prevent this construction from being inverted, that is, the first element 101 is connected to the connection elements 83a, 83b of the supporting mechanism of the elevator set 52 and, said second element 102 is fixed next to the outer walls of the elevator housing structure 58. Although the description of the embodiment presented here shows connection elements 83a, 83b (which would be, for example, hydraulic pistons to provide elevator turning), it is evident that the elements 101 or 102 may be fixed in other means, such as articulated arms, chains, or any other equivalent means, since the elevator rotation does not necessarily need to be done by the elements 83a, 83b, but can be carried out by other means, such as a hydraulic motor mounted on the lower proximal end 62 of the elevator.

According to the solution proposed by the elevator set 52, according to the object of the present invention, it is possible to provide adequate working conditions for the structure of the elevator housing 58 to move angularly due to the force (F) generated by contact with the trans-shipments and skips without affecting any other element or structural mechanism of the machine 10, including the connection elements 83a, 83b of the supporting mechanism of the elevator set 52 that will not sustain any strain or abrupt blows. Accordingly, there is a substantial structural improvement of the elevator set 52 as a whole, reducing downtime for maintenance and replacements of parts that may be damaged by the impacts caused by the collision of the elevator housing structure 58 with the trans-shipments and/or skips.

Additionally, such as mentioned, the present invention refers to a harvesting machine 10, such as one for harvesting tall and stalky plants as presented above, and said machine is comprised by the elevator set described above and which has a damper system 100 installed through the connection, on the one hand, in the connection elements 83a, 83b of the supporting mechanism of the elevator set 52, and on the other, in the structure of the elevator housing 58.

According to possible embodiments of the present invention, said harvesting machine 10 is designed and developed to promote the harvest of cane and/or sorghum.

Lastly, considering the foregoing, it is worth emphasizing that the objective of this description is solely to present and define in an exemplary manner particular embodiments of the elevator set 52 of harvesting machines of tall and stalky plants, according to the present invention. Therefore, as persons skilled in the art will appreciate, various modifications and combinations of elements and equivalent details are possible without straying from the scope of protection defined in the accompanying claims.

The invention claimed is:

1. An elevator set of a harvesting machine, the elevator set comprising:
    an elevator housing having a lower proximal end and an upper distal end;
    an elevator which extends inside the elevator housing between the lower proximal end and the upper distal end, the lower proximal end configured to be connected to a chassis of the machine, and the upper distal end having an opening for discharging harvested material; and
    a damper system that comprises:
        at least one first element and at least one second element, the at least one first element disposed on the elevator housing, and the at least one second element encased in the at least one first element in a sliding relationship; and
        at least one connector having a first end and a second end, the first end connected to the at least one second element and the second end configured to be connected to a portion of the chassis, the first end slidable along the elevator housing.

2. The elevator set according to claim 1, wherein the connector is a hydraulic piston.

3. The elevator set according to claim 1, wherein the at least one first element is a fixed base comprising tracks interconnected with the at least one second element by sliding means.

4. The elevator set according to claim 3, wherein the sliding means are:
    tabs which engage respective ones of the tracks;
    sliding guides which encase respective ones of the tracks;
    pulleys which move on the tracks; or
    rollers which move on the tracks.

5. The elevator set according to claim 1, wherein:
    the elevator housing comprises opposite sides;
    the at least one connector is two connectors;
    the at least one second element is two second elements connected to respective ones of the two connectors; and the at least one first element is two first elements disposed on the opposite sides of the elevator, each of the two first elements configured to house a respective one of the two second elements.

6. The elevator set according to claim 5, wherein the damper system a stopper interconnecting the two first elements.

7. A harvester comprising:
a chassis;
an elevator set comprising:
an elevator housing having a lower proximal end and an upper distal end;
an elevator which extends inside the elevator housing between the lower proximal end and the upper distal end, the lower proximal end fixed to the chassis of the machine, and the upper distal end having an opening for discharging the harvested material, the elevator having a first, top portion and a second, bottom portion; and
a damper system that comprises:
at least one first element and at least one second element, the at least one first element disposed on the elevator housing and extending fore of the first portion of the elevator and aft of the second portion, and the at least one second element encased in the at least one first element in a sliding relationship; and
at least one connector having a first end and a second end, the first end connected to the at least one second element and the second end connected to a portion of the chassis.

8. The harvesting machine according to claim 7, wherein the at least one connector is a hydraulic piston.

9. The harvesting machine according to claim 7, wherein the at least one first element is a fixed base provided with tracks for interconnecting with the at least one second element.

10. The harvesting machine according to claim 9, wherein the at least one second element comprises a sliding means for sliding on the tracks of the at least one first element.

11. The harvesting machine according to claim 10, wherein the sliding means are:
tabs which engage respective ones of the tracks;
sliding guides which encase respective ones of the tracks;
pulleys which move on the tracks; or
rollers which move on the tracks.

12. The harvesting machine according to claim 7, further comprising a primary extractor, wherein the second end of the at least one connector is fixed to the primary extractor.

13. The harvesting machine according to claim 7, wherein:
the elevator housing comprises opposite sides;
the at least one connector is two connectors;
the at least one second element is two second elements connected to respective ones of the two connectors; and
the at least one first element is two first elements disposed on the opposite sides of the elevator, each of the two first elements configured to house a respective one of the two second elements.

14. The harvesting machine according to claim 7, wherein the damper system further comprises a stopper interconnecting the two first elements.

15. The harvesting machine according to claim 7, wherein the harvesting machine is configured for harvesting tall and stalky plants.

16. The harvesting machine according to claim 7, wherein the harvesting machine is configured for harvesting sugarcane or sweet sorghum.

* * * * *